Jan. 2, 1968 P. J. DOCIMO 3,361,904
LIGHT FIXTURE
Filed June 30, 1965
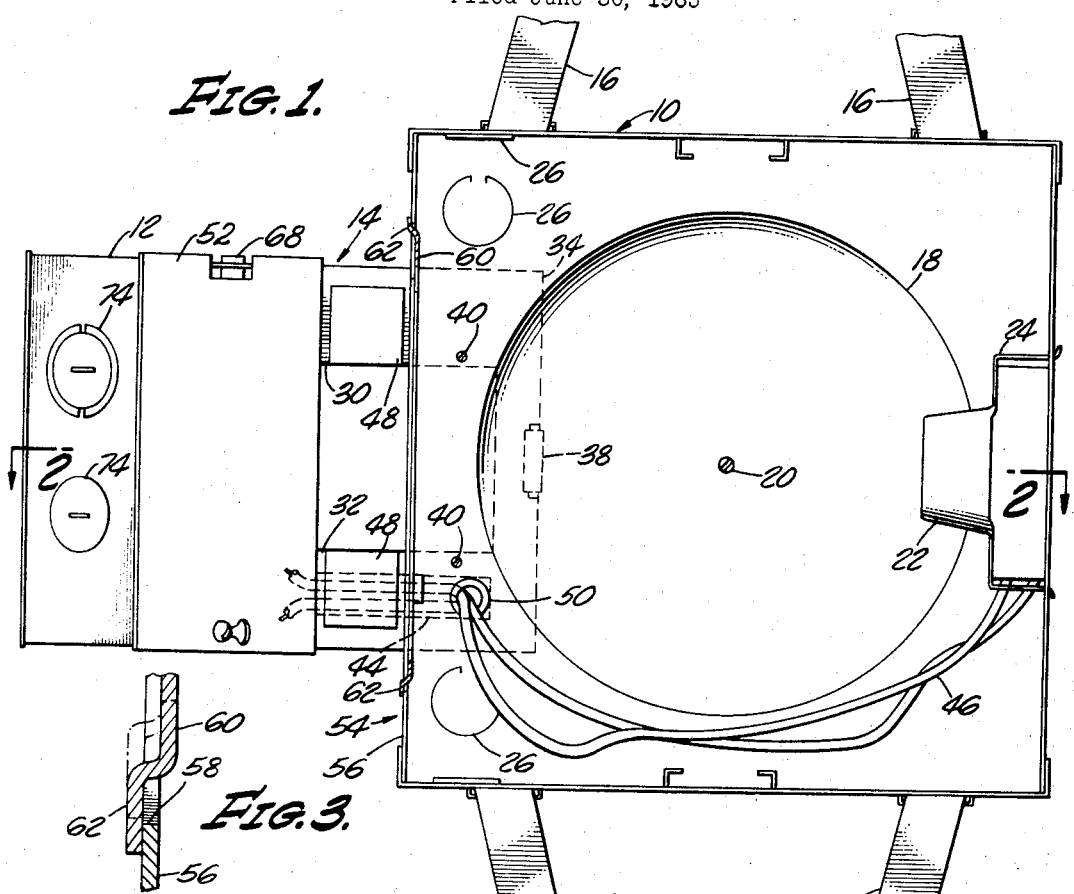
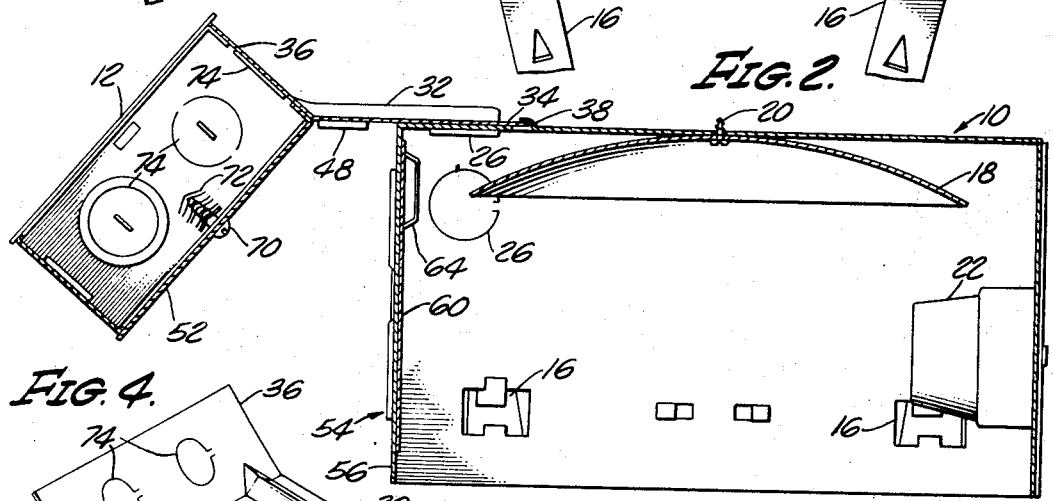
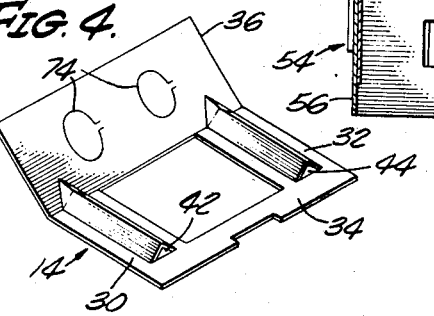
INVENTOR.
PETER J. DOCIMO
BY Lyon & Lyon
ATTORNEYS United States Patent Office 3,361,904
Patented Jan. 2, 1968

3,361,904
LIGHT FIXTURE
Peter J. Docimo, Los Angeles, Calif., assignor to Marvin Electric Manufacturing Company, Los Angeles, Calif., a corporation of California
Filed June 30, 1965, Ser. No. 468,406
7 Claims. (Cl. 240—78)

ABSTRACT OF THE DISCLOSURE

A recessed lighting fixture having a removable wall and having a junction box mounted on the housing of the fixture at an agle of approximately 45° with the removable wall of the housing. The wall of the junction box facing the housing is also removable providing easy access to the junction box either through the housing or from below.

This invention relates to a light fixture and more particularly relates to a recessed lighting fixture provided with a junction box which facilitates the installation of the wiring system.

Conventional recessed lighting fixtures are generally provided with a junction box at one side thereof having a removable wall parallel to a removable wall of the light fixture housing so that an electrical connection can be made between the building wiring and the socket of the light fixture. The building wiring is pulled to the junction box by the electrician and a connection then made in the junction box between this wiring and the light socket of the lighting fixture. Since the only access to the junction box is through the removable side walls, the wire pulling operation is obstructed as are the splices or other connections that must be made in the junction box. This makes it very difficult to perform a wire pulling operation in the same relatively simple manner as is done with a conventional surface mounted fixture, that is, by standing on the floor and pulling the wire in, for example, a hand over hand fashion. Ordinarily, with present day lighting fixtures, the electrician must use a ladder so that he can either get his hand completely above the junction box for the wire pull or at least manoeuver himself into a position wherein he can view the interior of the junction box and have sufficient room to perform the wire pulling operation and make whatever connections that may be required.

In many instances, the ceiling height is such that if the electrician could have direct access to and through the junction box, he could perform his wire pulling operation while standing on the floor. This, of course, would greatly simplify the installation of the lighting fixture and significantly reduce the time and cost involved in installing a complete illuminating system. The junction box, of course, must remain accessible from the lighting fixture since once the fixture has been installed and the ceiling plastered or otherwise finished, the only access route available to the junction box will be through the lighting fixture housing itself.

According to the present invention, a lighting fixture is provided which permits easy access to the junction box from the floor as well as from the housing and permits a wire pulling operation to be satisfactorily performed by an electrician standing on the floor and pulling in the same manner as he would with a surface mounted fixture. The fixture of the present invention provides more room for the wire pulling operation and for other operations which must be performed in the junction box and permits visual inspection of the junction box from the floor. These advantages are achieved by mounting a junction box with its removable wall facing the removable wall of the housing and forming an acute angle therewith, the angle preferably being approximately 45°.

It is therefore an object of the present invention to provide a lighting fixture in which the housing and the junction box are so constructed that easy access is possible to the junction box either from the floor or from the housing.

It is also an object of the present invention to provide a lighting fixture in which more working space and greater access are available than in fixtures heretofore provided.

It is another object of the present invention to provide a junction box through which a wire pulling operation can easily and quickly be performed.

These and other objects and advantages of the present invention will become more apparent upon reference to the accompanying description and drawings in which:

FIGURE 1 is a bottom plan view of the lighting fixture of the present invention;

FIGURE 2 is a cross-sectional view taken along lines 2—2 of FIGURE 1;

FIGURE 3 is a sectional detail view; and

FIGURE 4 is a perspective view of a bracket used in the structure of the present invention.

Turning now to the drawing, the lighting fixture of the present invention includes a housing 10 and a junction box 12 which are connected together by means of a bracket 14. The housing 10 is provided with mounting brackets 16 for mounting the assembly in a ceiling in the conventional manner. The housing 10 is further provided with a reflector 18 which is connected to the top wall of the housing by means of a screw 20. An electric light bulb socket 22 is mounted onto one of the side walls of the housing 10 by means of a bracket 24. The housing is also provided with a plurality of knockout plugs 26 as is conventional.

The bracket 14 is provided with two arms 30 and 32, a first cross piece 34 and a second cross piece 36. The bracket 14 is mounted on the housing 10 by slipping the cross piece 34 under a tab 38 formed on the top surface of the housing 10 and then riveting the arms 30 and 32 to the top wall of the housing 10 by means of the rivets 40. The arms 30 and 32 are provided with passageways 42 and 44, respectively, through which wires 46 leading from the socket 22 to the interior of the junction box 12 may be passed. The passageways may be conveniently stamped from the material of the arms 30 and 32, and, if desired, plates 48 may be positioned below them to prevent any wires from protruding out of them. The top wall of the housing is provided with a hole in which is positioned a grommet 50 through which the wires pass into the pasageway 32.

As can be seen in FIGURE 4, the cross piece 36 is bent at an angle, preferably at 45°, with the arms 30 and 32 and the cross piece 34 and serves as the end wall of the junction box 12 so that the removable bottom wall 52 of the junction box is held at an acute angle with the removable wall 54 of the housing 10. The removable wall 54 may conveniently comprise a frame 56 attached to the adjoining vertical side walls of the housing 10 and having a vertical opening 58 in which is slidably mounted a plate 60. As can be seen in FIGURE 3, the plate 60 is provided with tabs 62 which extend through the opening 58 and are spaced such that if the plate 60 is moved sideways to its farthest position, one of the tabs 62 will be freed of the frame 56 and can be moved through the opening 58 so that the plate 60 can be removed. The plate 60 is prevented from moving outwardly through the opening 58 by extending its upper and lower limits beyond the limits of the opening 58. The plate 60 is conveniently provided with a handle 64 to facilitate its sliding movement.

The bottom wall of the junction box 52 is provided with a tap 68 which cooperates with a slot formed in one of the end walls of the junction box to hold one end of the wall 52 in place. The other end of the wall 52 is held in place by a screw 70 which cooperates with threads 72 that are punched into the other end wall of the junction box 12. The end and said walls of the junction box 12, including the wall 36, are provided with a plurality of knock-out plugs 74. Preferably, the top wall of the junction box is also removable so that access may be gained from above if necessary.

During installation, the housing 10 and its attached junction box 12 are mounted in a recess in a ceiling by means of the bracket 16. The bottom wall 52 of the junction box is removed and at least one of the knock-out plugs 74 in the wall 36 of the junction box 12 is removed. The ends of the building wiring are then passed through the hole left by the knock-out plug and through the now open bottom of the junction box 12. As can be seen, the electrician can easily stand below the junction box 12, for example, on the floor, and reach up through the open bottom of the junction box to the knock-out hole in its upper side wall to grasp the wiring and give it a straight pull. After the wire has been pulled and the connection between the junction box and the socket in the housing made, the bottom wall 52 of the junction box is replaced as is the plate 60 of the housing 10. The plastering or other finishing of the ceiling is now completed. If it later becomes necessary to gain access to the junction box, all that need be done is to remove the bottom plate 52 of the junction box and the plate 60 from the frame 56 of the housing 10. The interior of the junction box is now accessible through the housing 10.

From the foregoing description it can be seen that a lighting fixture has been provided which permits the easy and convenient performance of a straight pull of building wiring through a junction box. This is accomplished by positioning the junction box with relation to the vertical side walls of the housing such that the removable bottom wall of the junction box forms an angle of approximately 45° with the removable side wall of the housing. In this manner, the junction box need be provided with only one removable wall, thus simplifying its construction and reducing its cost.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. In a recessed lighting fixture, the combination comprising: a housing adapted to mount an electric lamp, said housing having a plurality of vertical side walls and a top wall, one of said side walls being removable; a junction box having side walls and top and bottom walls, said bottom wall being removable; and bracket means having one end attached to the top wall of said housing and the other end attached to a side wall of said junction box so that the removable bottom wall of said junction box faces the removable side wall of said housing and forms an angle of approximately 45° therewith.

2. In a recessed lighting fixture, the combination comprising: a housing adapted to mount an electric lamp, said housing having a plurality of vertical side walls and a horizontal top wall, one of said side walls including a removable panel; a junction box having side walls and top and bottom walls, at least a portion of said bottom wall being removable and at least one of said side walls having a knock-out plug; and bracket means having one end attached to said top wall of said housing and the other end attached to said one side wall of said junction box so that the bottom wall of said junction box faces said one side wall of said housing and forms an acute angle therewith whereby access to the interior of said junction box can be gained through said housing or from underneath said junction box.

3. The apparatus of claim 2 wherein said bracket means includes an enclosed passageway having one end communicating with the interior of said housing and the other end communicating with the interior of said junction box for carrying wiring from said housing to said junction box.

4. The apparatus of claim 2 wherein said acute angle is approximately 45°.

5. The apparatus of claim 2 wherein said one side wall of said junction box and said bracket means are integral.

6. The apparatus of claim 3 wherein said one side wall of said junction box and said bracket means are integral.

7. The apparatus of claim 6 wherein said passageway is stamped from the material of said bracket means and said one side wall of said junction box is bent at an angle of approximately 45° from the remainder of said bracket means.

References Cited
UNITED STATES PATENTS

| | | | |
|---|---|---|---|
| 2,561,986 | 7/1951 | Jones | 240—78 |
| 2,717,955 | 9/1955 | Schwemmer et al. | 240—78 |
| 3,091,687 | 5/1963 | Papsdorf | 240—78 |

NORTON ANSHER, *Primary Examiner.*

M. H. HAYES, *Assistant Examiner.*